Patented Aug. 22, 1944

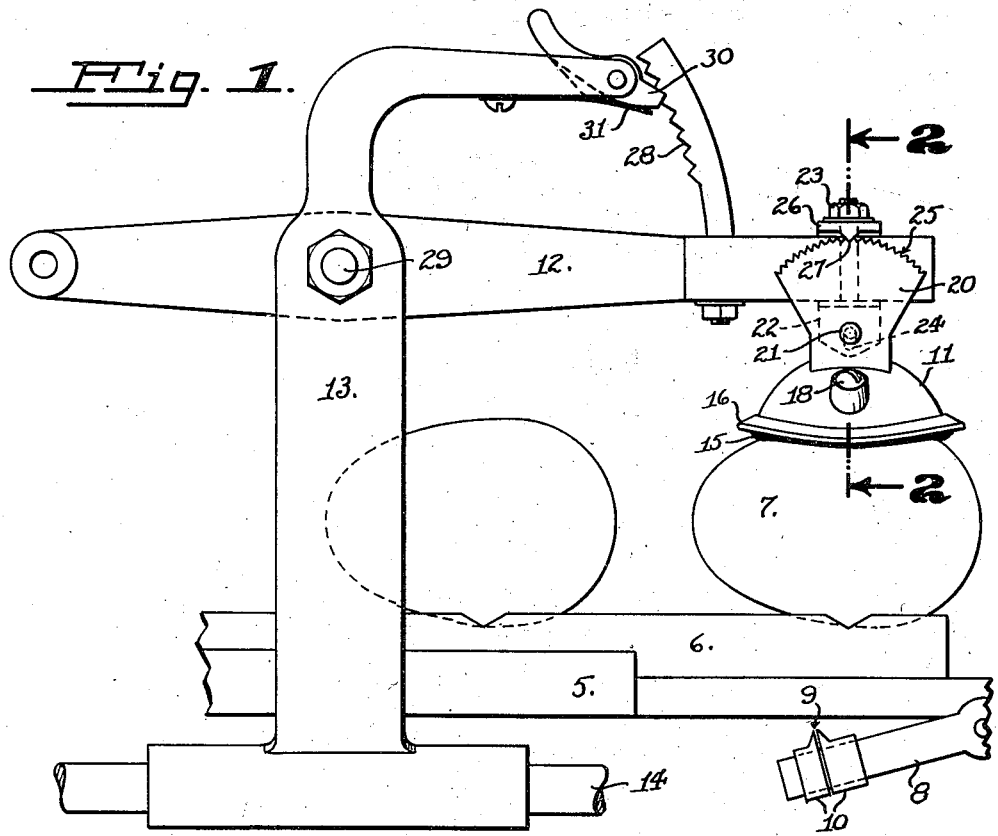
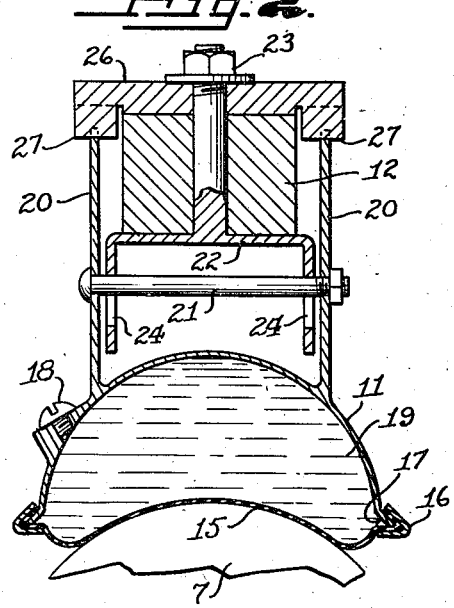

2,356,707

UNITED STATES PATENT OFFICE 2,356,707

PRESSER HEAD FOR EGG OPENING MACHINES

Laurence M. Sigler, Washington, D. C., assignor of one-third to James C. Gill and one-third to Kathryn B. Gill, both of San Francisco, Calif.

Application March 23, 1943, Serial No. 480,253

6 Claims. (Cl. 146—2)

The present invention relates to machines for opening eggs, and more particularly to means for holding the egg firmly and accurately in position during the operation of cracking and opening its shell.

The invention may be used to advantage in egg opening machines of any type, but for purposes of illustration herein it has been shown as applied to a machine of the type disclosed in my United States Patent No. 2,229,349, issued January 21, 1941, in which the eggs are advanced in a file with a step by step motion. At the last position of its advance, the egg is held down on its conveyer by a presser head which descends into contact with its upper surface, and a pair of sharp prongs are moved upwardly from beneath to penetrate the shell on its lower surface. Immediately subsequent to penetration, the prongs are moved apart, thereby opening the egg from beneath by cracking the shell in two and separating the two halves. The contents of the egg thereupon drops down into a suitable conveyer pan below.

The present invention constitutes an improved presser head, and has for its principal object to provide means for holding the egg firmly so that it cannot jump up or roll out of place under the impact of the breaking instrument. Other and equally important objects are to provide a presser head which will conform to the shape and size of the egg and will exert equal pressure upon the entire area of the egg shell with which it is in contact, so that eggs of different shape and size can be run indiscriminately, and which will have a slight amount of resilience when pressure is first applied, in order to avoid cracking the egg shell when the presser head descends upon it. Still further objects and advantages of the invention will be apparent from the following description, which should be read with the understanding that changes, within the scope of the claims hereto appended, may be made in the form, construction and arrangement of the several parts herein shown and described, without departing from the spirit of the invention as defined in said claims.

Reference will be made to the accompanying drawing, wherein

Fig. 1 is a side elevation of a portion of an egg opening machine showing my improved presser head in operative position.

Fig. 2 is a section on the line 2—2 of Fig. 1, enlarged.

In the drawing, the reference numeral 5 designates the bed or table of the machine, upon which operates a conveyer bar 6 with related fore and aft and up and down motion, whereby the egg 7 is advanced step by step to the position shown, where an opening instrument mounted on a lever 8 rises sharply against the under side of the egg. The opening instrument comprises a pair of prongs 9 carried by slides 10 mounted on the lever 8, said prongs penetrating the bottom of the shell of the egg 7 and then being separated to crack and open said shell. The lever 8 and prongs 9 may be assumed to rise through a suitable aperture, not shown in the conveyer 6. The mechanism for operating the parts above described has been omitted from the drawing, being well known in the art, and shown in said Patent No. 2,229,349.

The egg 7 is held firmly on the conveyer at the opening position by a presser or contact head 11 carried by a movable arm 12 pivotally mounted on a reciprocating bracket 13, which slides on a guide 14 in synchronism with the movements of the conveyer bar 6. The presser head 11 descends upon the egg 7 and moves longitudinally with said egg as it approaches its final or opening position, holds it in said position during the opening operation, and then rises and moves back, freeing the broken shell for ejection and assuming a position for holding contact with the next following egg. These movements of the presser head are generally similar to those described in Patent No. 2,229,349 referred to previously. The mechanism for producing said movements is shown in said prior patent, is well understood in the art, and has therefore been omitted from the drawing herein.

My present invention concerns the presser head 11 and the arm 12. The head 11 comprises an inverted cup having a resilient diaphragm 15, of thin rubber or other suitable material, covering its open bottom. The diaphragm may be attached to the cup in any suitable manner, as for example by a metal ring 16 crimped over a peripheral flange 17 on said cup, the edge of the diaphragm being clamped over said flange and between it and the ring to make a tight seal.

The cup 11 has a filler plug 18, and is filled with water or other suitable liquid 19. When the head descends upon the egg, the diaphragm assumes the shape of the upper surface of said egg, and grips it firmly so that it cannot roll regardless of the shape of the egg. The diaphragm provides some resilience by stretching and bulging downwardly around the edges as the egg presses it upwardly in the middle, as shown. Once the limit of stretch of the diaphragm has been reached, the liquid 19 provides a rigid mass between the egg and the head, but exerts equal pressure on all parts of the egg shell with which the diaphragm is in contact.

The head is movably carried by the arm 12, so that it can drop centrally upon eggs of various shapes and sizes, but is provided with automatic means to lock it in position when it has found its proper position on the egg. A pair of spaced vertical plates 20 are welded or otherwise fastened to the top of the cup 11, and have a transverse pin 21 fixed between them. An inverted U-shaped stamping 22 is fixed to the bottom of the arm 12 by a stud and nut 23, and has its legs between the plates 20. Slots 24 in the stamping 22 ride upon the pin 21, so that the head 11 can move up and down for a limited distance with respect to the arm.

The upper ends of the plates 20 are serrated and formed upon arcs centered about the pin 21, as shown at 25. A plate 26 is secured to the top of the arm 12 by the nut 23, and has downwardly projecting prongs 27 positioned to engage the teeth 25. Therefore, when the head 11 is hanging from the arm 12, it can swing freely, and will conform its position to that of the egg 7 upon which it descends, but when the arm has moved down further, the prongs 27 engage the teeth 25 and lock the head in position, and sufficient pressure can be exerted upon the egg to hold it firmly in position.

As the weight of the arm 12 may not exert sufficient pressure to hold the egg from jumping when it is struck from below by the opening instrument 9, I provide an arcuate ratchet 28 secured to the arm and centered about its pivot 29. The teeth of said ratchet are engaged by a pawl 30, actuated by a spring 31, to hold the arm down when it has found its lowest position. Any suitable means, not shown, must be provided for releasing the pawl 30 just before the arm begins to move upwardly.

It will be seen from the foregoing description that my improved presser head provides a contact member which conforms automatically to the shape and size of the egg on which it rests; that it applies equal pressure over a considerable area of the shell of the egg; that it adjusts itself to slight irregularities in the position of the egg; that it has sufficient resilience to avoid breaking the egg when it descends upon it, but is substantially rigid when full pressure has been applied and it is locked in position; and that, by so doing, it holds the egg firmly in position and insures that said egg will be broken and opened only from the bottom.

Although air or other compressible fluid may be used in the cup, or it may be provided with a resilient cushion such as a pad of sponge rubber, I prefer a liquid because of the rigidity it supplies when pressure is applied. Too much resilience, such as might be provided by a compressible cushion if it were not precisely proportioned, permits the egg to jump when struck from beneath by the opening instrument, and results in imperfect opening.

I claim:

1. A presser head for egg opening machines comprising a fluid containing cup, a flexible resilient diaphragm closing the open end of said cup and confining a body of fluid therein, and movable means connected with said cup whereby it can be moved into contact with a positioned egg.

2. A presser head for egg opening machines comprising a liquid containing cup, a flexible resilient diaphragm closing the open end of said cup and confining a body of liquid therein, and movable means connected with said cup whereby it can be moved into contact with a positioned egg.

3. A presser head for egg opening machines comprising a fluid containing cup, a flexible resilient diaphragm closing the open end of said cup and confining a body of fluid therein, a movable member, a connection between said cup and said member permitting limited relative movement therebetween, and means for locking the cup rigidly to said member at one limit of said relative movement.

4. A presser head for egg opening machines comprising a fluid containing cup, a flexible resilient diaphragm closing the open end of said cup and confining a body of fluid therein, a member connected with said cup and movable in a direction to bring said cup into position with a positioned egg, and locking means cooperating with said member to prevent movement thereof in the reverse direction.

5. A presser head for egg opening machines comprising a vertically movable supporting member, a contact member suspended therefrom having a flexible resilient surface for contact with a positioned egg, a pivot connecting said members, one of said members having a vertical slot in which said pivot operates whereby said contact member may swing freely when suspended from said supporting member, and cooperating locking means on said members positioned for mutual engagement when said pivot is shifted in said slot.

6. In an egg opening machine, a lever movable in a substantially vertical plane, an inverted cup suspended from said lever, a flexible diaphragm closing the open end of said cup and confining a body of fluid therein, a pivotal and slidable connection between said lever and said cup permitting limited relative vertical movement therebetween, and means on said cup and said lever positioned to cooperate to lock said cup and said lever rigidly together at one limit of said relative movement.

LAURENCE M. SIGLER.